(12) United States Patent
Green

(10) Patent No.: US 7,068,170 B2
(45) Date of Patent: Jun. 27, 2006

(54) RFID EMBEDDED MATERIALS

(75) Inventor: Craig B. Green, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 10/810,105

(22) Filed: Mar. 26, 2004

(65) Prior Publication Data

US 2005/0212675 A1 Sep. 29, 2005

(51) Int. Cl.
*G08B 13/14* (2006.01)

(52) U.S. Cl. .............................. 340/572.1; 340/572.8; 340/572.9; 235/492

(58) Field of Classification Search ............. 340/572.1, 340/572.8, 572.9; 235/492
See application file for complete search history.

(56) References Cited

U.S. PATENT DOCUMENTS

| 6,140,146 | A | 10/2000 | Brady et al. | |
|---|---|---|---|---|
| 6,259,369 | B1 * | 7/2001 | Monico | 340/572.8 |
| 6,265,977 | B1 * | 7/2001 | Vega et al. | 340/572.7 |
| 6,275,156 | B1 * | 8/2001 | Rasband | 340/572.1 |
| 6,281,795 | B1 * | 8/2001 | Smith et al. | 340/572.1 |
| 6,478,229 | B1 | 11/2002 | Epstein | |
| 6,736,980 | B1 * | 5/2004 | Moscaritolo | 210/741 |

FOREIGN PATENT DOCUMENTS

CA 2345883 A1 * 7/2002

OTHER PUBLICATIONS

Microchip Technology Inc., Microchip MCRF355/360, 13.56 MHz Passive RFID Device with Anti-Collision Feature; 2002, DS21287F pp. 1-22.
Want, Roy, IEEE Distributed Systems Online, Ubiquitous Electronic Tagging, © 2000, Institute of Electrical and Electronics Engineers, Inc., vol. 1, No. 2, pp. 1-11.
Robbins, William P., Integrated Microsensors for Aircraft Fatigue and Failure Warning, University of Minnesota.
The Association for Automatic Identification and Data Capture Technologies, *What is Radio Frequency Indentification (RFID)?*, www.aimglobal.org/technologies/rfid/what_is_rfid.asp, 2 pages.
RFID Journal Inc., *Hitachi Unveils Smallest RFID Chip*, www.rfidjournal.com/article/articleview/337/1/1, 2004, 2 pages.
HighTechAid, *RFID—The Technology*, www.hightechaid.com/tech/rfid/rfid_technology.htm, Apr. 2004, 3 pages.

(Continued)

*Primary Examiner*—Benjamin C. Lee
*Assistant Examiner*—Travis Hunnings
(74) *Attorney, Agent, or Firm*—Thompson Coburn LLP

(57) ABSTRACT

Methods of identifying products by using small radio frequency identification tags mixed in a liquid, the mixtures, and articles coated with such mixtures are provided. One exemplary mixture includes a liquid that is able to retain at least one of the tags when the liquid is applied to a surface. An exemplary method of identifying a product includes introducing at least one radio frequency identification tag into a liquid that is able to retain the tag when the liquid is applied to a surface.

21 Claims, 3 Drawing Sheets

OTHER PUBLICATIONS

Hitachi, *The World's Smallest RFID IC, u-chip,* www.hitachi.co.jp/Prod/mu-chip/, 2002, 2004, 1 page.

Pister, *Smart Dust Autonomous Sensing and Communication in a Cubic Millimeter,* http://robotics.eecs.berkeley.edu/~pister/SmartDust/, Berkeley, 5 pages.

Purdue News, *Engineers Create 'Structural Radar' to Monitor Aircraft, Vehicles,* http://news.uns.purdue.edu/UNS/html4ever/011115.Adams.diagnostic.html; West Lafayette, Indiana, Nov. 15, 2001, 6 pages.

James, III, George H., *Development of Structural Health Monitoring Techniques Using Dynamics Testing,* unlimited release prnted Mar. 1996 by Sandia Report, Sandia National Laboratories, Albuquerque, NM for the United States Department of Energy, 1 page.

\* cited by examiner

RFID EMBEDDED MATERIALS

FIELD OF THE INVENTION

This invention relates generally to methods of, and apparatus for, tracking products and, more particularly, to radio frequency identification of products.

BACKGROUND OF THE INVENTION

A need exists to identify and track assets throughout commercial supply chains and operations. Radio-frequency identification (RFID) is an emerging and evolving technology designed to automate and improve the efficiency and accuracy of the asset management process wherein the assets are identified and tracked. In addition, RFID can be used to maintain records about an item on which the RFID tag is placed. Currently, assets are tracked by placing an adhesive on the surface of the asset and then affixing an RFID tag to the object. Alternatively, the RFID tag may be affixed to one side of a piece of double sided tape, a tie cord, or other fastener. Subsequently, the backing on the other side is peeled off and the tape, carrying the RFID tag, is affixed to the asset. However, in some applications, this means of attachment is not practical, possible, or cost-effective.

In addition, another need exists in applications, such as aircraft operation, to monitor the condition of components and assemblies to determine the health of the product (e.g. to ascertain the need for preventative maintenance). Within the aerospace market, vehicle health monitoring is desired by both commercial and military organizations, in particular, to collect information on stress loads the aircraft is experiencing. Such information enables the operator to predict fatigue life. The latter need is becoming more important as operators extend the lifespan of their aircraft fleet. Accordingly a need also exists to obtain and record product health information in a cost-effective manner.

SUMMARY OF THE INVENTION

It is in view of the above problems that the present invention was developed. The invention includes methods and apparatus to identify and track products using radio frequency identification.

In accordance with the principles of the present inventions, a preferred embodiment includes a mixture of a liquid and RFID tags. The properties of the liquid and tag are chosen so that the liquid retains the tag within the liquid when the liquid is applied to a surface. In particular, RFID tags less than 0.25 square millimeters are added to the liquid to create the mixture. Thus, the mixture may be applied to surfaces with a brush or even a syringe, squeeze tube, or other applicator.

Moreover, the liquid is chosen based on its properties such as, for example, viscosity, density, and surface tension to enhance the ability of the liquid to retain the tag. Of course, related properties of the tag (e.g. wettability and density) may additionally be considered. The liquid includes coatings such as a paints, adhesives, and sealants. Though, the liquid could be any of a wide variety of materials even including liquids that set (e.g. plastics or polymer precursors). Thus, moldable products may be formed from the RFID tag/liquid mixture as well.

Additionally, other preferred embodiments provide methods of identifying products using a mixture of RFID tags and liquids. In one preferred embodiment, the RFID tags are added to a liquid to create a mixture. Thereafter, the mixture is applied to a surface and allowed to dry whereupon the RFID tag is retained in the dried coating. In yet another preferred embodiment, a product is molded from a mixture of RFID tags in a liquid. The liquid then sets to form the product with at least one embedded RFID tag.

Thus, in accordance with the principles of the present invention, the need to attach a separate RFID tag to an item to be identified, or tracked, is eliminated. In addition, the present invention avoids the need for an additional step in the manufacturing or asset management process to add the RFID tag. In addition, other preferred embodiments provide methods and apparatus to monitor the health of the assets so identified.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
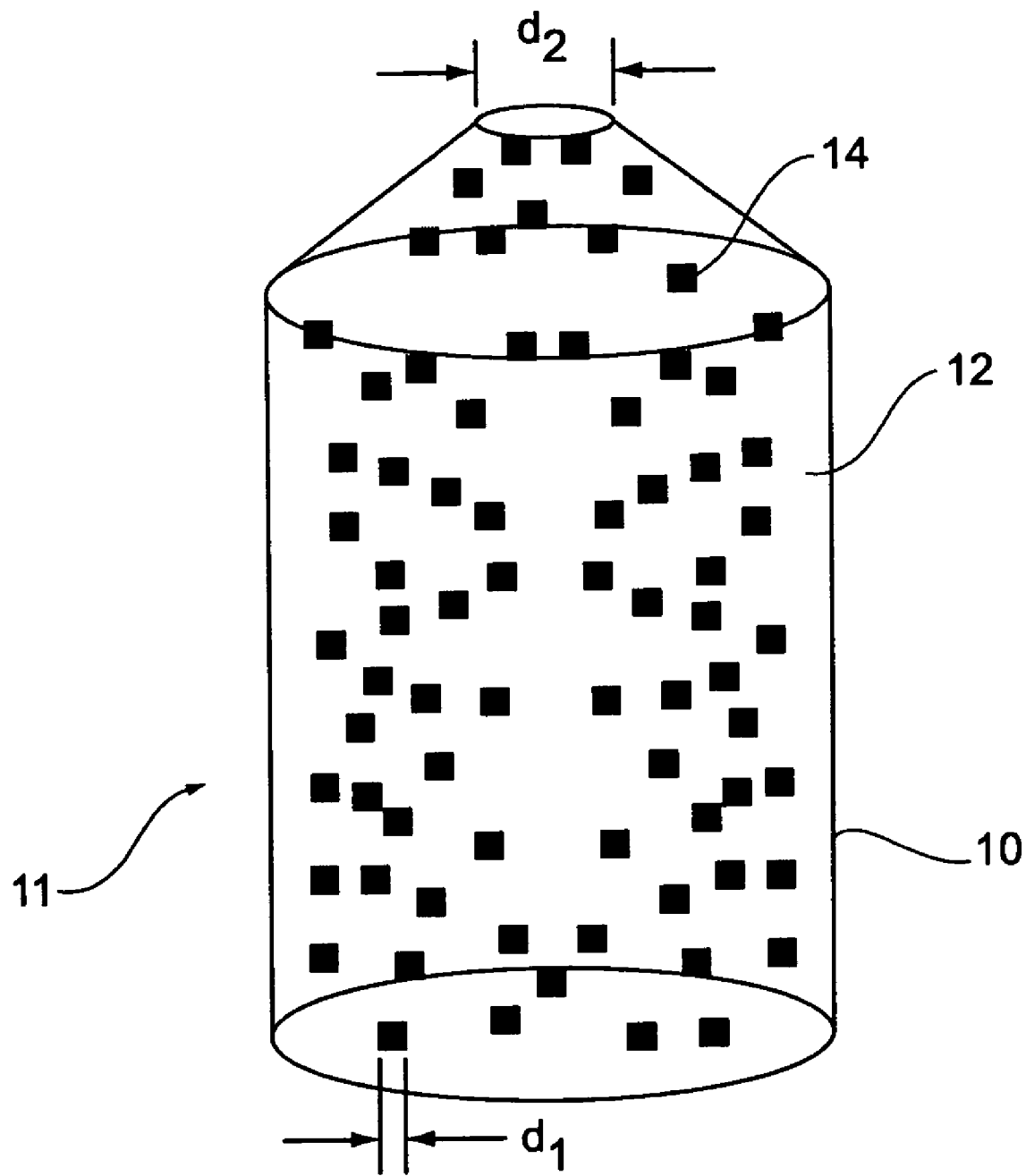
FIG. 1 illustrates a mixture in accordance with a preferred embodiment of the present invention.

Referring to the accompanying drawings in which like reference numbers indicate like elements, FIG. 1 illustrates a container 10 holding a mixture 11 in accordance with a preferred embodiment of the present invention. The container 10 may be any container suitable for holding a liquid. In one preferred embodiment the container 10 is a squeeze tube (e.g. for applying a sealant or adhesive).

As shown, a liquid 12 and a plurality of RFID tags 14 form the mixture 11. Many types of liquids may be employed to carry the tags 14 in accordance with the spirit and scope of the present invention. For instance, the liquid 12 may be a paint, varnish, corrosion inhibitor, sealant, adhesive, fuel, lubricant, hydraulic fluid, putty, caulk, or solvent. Note also that the liquid may have a very high viscosity like that of caulk which is on the order of 100,000,000 centipoise. Moreover, the present invention is not limited to liquids, for the tags 12 may be mixed into granular solids also such as resins, powdered coatings, grains, dusts, sands, and other bulk materials.

The tags 14 are preferably small, on the order of 4 square millimeters or less and may be either passive or active components. In one preferred embodiment the tags are approximately 0.25 square millimeters in area. For applications wherein the mixture 11 is to be used in a squeeze tube (as shown in FIG. 1) or in a process system (the liquid 12 being the process fluid) the tags are preferably sized to pass through any restrictions in the system. For applications involving the squeeze tube 10, the tags 14 should have widths d1 less than the diameter d2 of the squeeze tub tip 16. Thus, the tag 14 may pass through the tip 16 with the liquid 12 as it is being applied.

Figure 2:
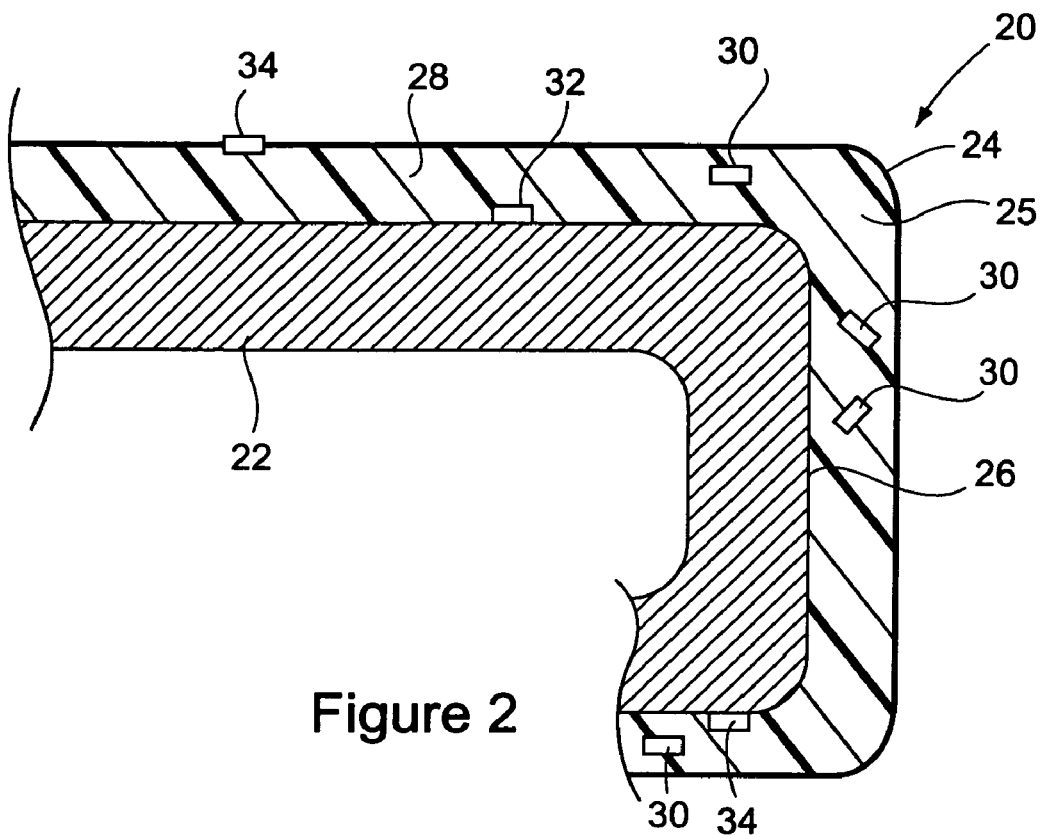
FIG. 2 illustrates a product coated with the mixture of FIG. 1.

With reference now to FIG. 2, a product in accordance with a preferred embodiment of the present invention is illustrated. The product 20 includes a body 22 and a coating 24. The coating coats a surface 26 of the product 20. As illustrated, the exemplary coating 24 constitutes a paint or other surface finish. In yet another preferred embodiment, the coating 24 includes a chromate based corrosion inhibitor in widespread use on aerospace and marine vehicles. The coating 24 also includes a plurality of RFID tags 30 to 34.

When the coating 24 is applied to the surface 26, the coating 24 typically includes a liquid component 25. Other additives may be included in the coating 24 without departing from the spirit or scope of the present invention. Thus, the coating 24 may be applied to the surface 26 with any conventional applicator such as a paintbrush, roller, squeeze tube, spray nozzle or squeegee. After the liquid component dries or sets (if it dries or sets) the tags 30 to 34 remain in the coating 24. Notably, the tags 30 to 34 may be neutrally buoyant in the liquid 25 (see tag 30), denser than the liquid (see tag 32), or not as dense as the liquid (see tag 34). Thus, the tags 30 to 34 may be tailored to sink in, float in, or float on the liquid 25. Accordingly, the tags 30 to 34 are either entirely, or partially, submerged or immersed in the liquid 25.

Additionally, the liquid 25 (shown in FIG. 2) may be chosen based on various mechanical properties such as surface tension and viscosity so that the tags tend to remain in the liquid 25 regardless of the orientation of the surface 26. Likewise, the properties of the tag may be selected to enhance the ability of the liquid 25 to retain the tags 30 to 34. For instance, the tag density, weight, size, and wettability may be chosen to cause the tags 30 to 34 to remain in the liquid 25 even when applied to a vertical (or inverted) surface. Further, the liquid 25 may be a two part system in which the two liquids are mixed together immediately before use to form the product. Accordingly, the tags 30 to 34 may be added as the two liquids are being mixed. Thus, the present invention allows for identification of products formed with a particular batch of the liquid 25.

Regarding the tags 30 to 34, a variety of tags are available and include tags with limited memory to memories large enough to contain much data. For embodiments employing the tags with less memory, a serial number for the product 20 (or a batch number for the liquid 25) may be contained on the tags 30 to 34. The serial number or code may be stored in a database where other information regarding the product 20 or liquid 25 is stored and therein associated with the product 20. In a preferred embodiment, tags with larger memories are employed and the data associated with the product 20 or liquid 25 may be stored on the tags 30 to 34. Such data includes, but is not limited to, a part number, an assembly number, an expiration date, a service date, or an employee number of the employee performing manufacturing, service, maintenance, or tag scanning on the product 20. Re-writable tags 30 to 34 are particularly well suited to these applications since data stored thereon may be changed as circumstances dictate, although read only tags 30 to 34 are also within the spirit and scope of the invention.

Figure 3:
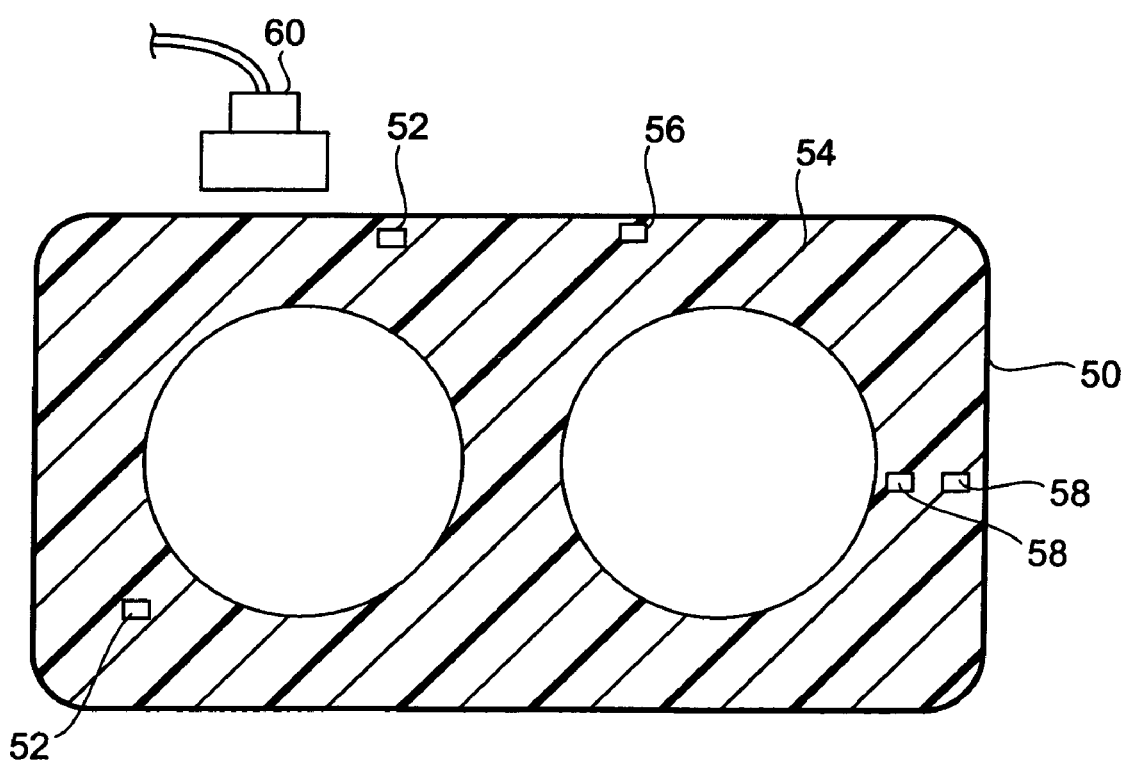
FIG. 3 illustrates a product formed with the mixture of FIG. 1.

FIG. 3 illustrates yet another preferred embodiment of the present invention. The product 50 shown may be, for instance, a gasket made from a moldable material 54 (e.g. plastic resin beads). As with the coating 24 (of FIG. 2), after the moldable material 54 sets, the product 50 includes the RFID tags 52 embedded in its body. Additionally, MEMS devices 56 and 58 may likewise be mixed into the liquid 12 (of FIG. 1 for example) or embedded in the product 50. In one preferred embodiment, the MEMS devices may include a pressure (or strain) sensor 56 and temperature sensors 58. Though any type of miniaturized instrument may be embedded in the product 50. Exemplary MEMS sensors 56 and 58 are available in the form of SMART DUST from Dust, Inc. of Berkeley, Calif. In the alternative, the sensors and RFID circuitry may be combined on one chip and then embedded in the products or coatings discussed herein.

In operation, once the product 50 is formed, the tags 52 may be used to identify and track the product by reading the tag 52 with an interrogator 60. Thus, no product markings, nameplates, engravings, stampings, or other indicia (e.g. a name plate with a serial number) need be included on the product 50 to identify it. Moreover, because the tags 52 remain in the body of the product 50, the identification indicia (the tag 52) cannot be separated from the product 50 as previous indicia could.

For instance, previous identifying indicia reside on (i.e. above) the surface of the product. Thus, abrasion or abuse of the product preferentially tends to remove the identifying indicia. In the alternative, other previous tags were sandwiched between layers of the product. These systems have also proved unsatisfactory because the sandwiching process necessitates additional manufacturing steps and increases the part count for the product. The present invention avoids these disadvantages. In particular, products manufactured in accordance with the principles of the present invention, require no additional manufacturing steps and enjoy a reduced part count and improved resistance to tag damage (and separation).

Furthermore, because the tags 52 and sensors 56 and 58 may communicate with each other (e.g. by tag-to-tag data hopping in a manner well known in the art) the interrogator 60 need only be able to access one tag 52, or sensor 56 or 58, in order to determine the identities of all tags 52 in the product 50. Likewise, by interrogating one of the tags 52 (or sensors) the conditions sensed by the sensors 56 and 58 (and the identity of the tags) may be determined. Thus, even if most of the product 50 is not accessible to the interrogator 60, access to even one tag 52 allows interrogation of the entire set of tags 52 and sensors 56 and 58 in the product 50.

Thus, the exemplary product 50 may be placed in service in relatively inaccessible locations. For instance, the gasket 50 can be placed between two metallic sealing surfaces. As long as enough tags 52 are embedded in the material 54 to ensure that one is near the edge of the gasket 50, the entire set of conditions to which the gasket 50 is subject may be determined. In particular, if the pressure sensor 52 senses a decrease in pressure, the gasket 50 may need to be tightened. Similarly if the temperature sensors 58 detect a change in temperature, a leak may be imminent. Thus, preventative maintenance may be called for in a more timely manner. Accordingly, the present invention provides an increase in reliability and service life for products 50 made in accordance therewith.

Moreover, the liquid 12 (of FIG. 1) and material 54 (of FIG. 3) may be chosen with regard to the materials' electromagnetic properties. In particular, these materials may be chosen such that the electromagnetic attenuation coefficient of the coating 24 or material 54 allows the electromagnetic energy radiating from the tags 52 (at the frequency at which the tags operate) to pass through the material without attenuation. Contrawise, the tag 52 or its operating frequency may be chosen to best fit the properties of the liquid 12 (or the material formed therefrom). Thus, the operating frequency may be tuned to the material. It is also worth noting, that the ability to read the tags 52 is also influenced by the size of the antenna attached to the tag. Thus, the antennas could be enlarged to improve the propagation of the electromagnetic energy reflected from the tags 52. In one preferred embodiment, an antenna large enough to allow the tag 52 to be read from about an inch away is attached to the tag 52.

Figure 4:
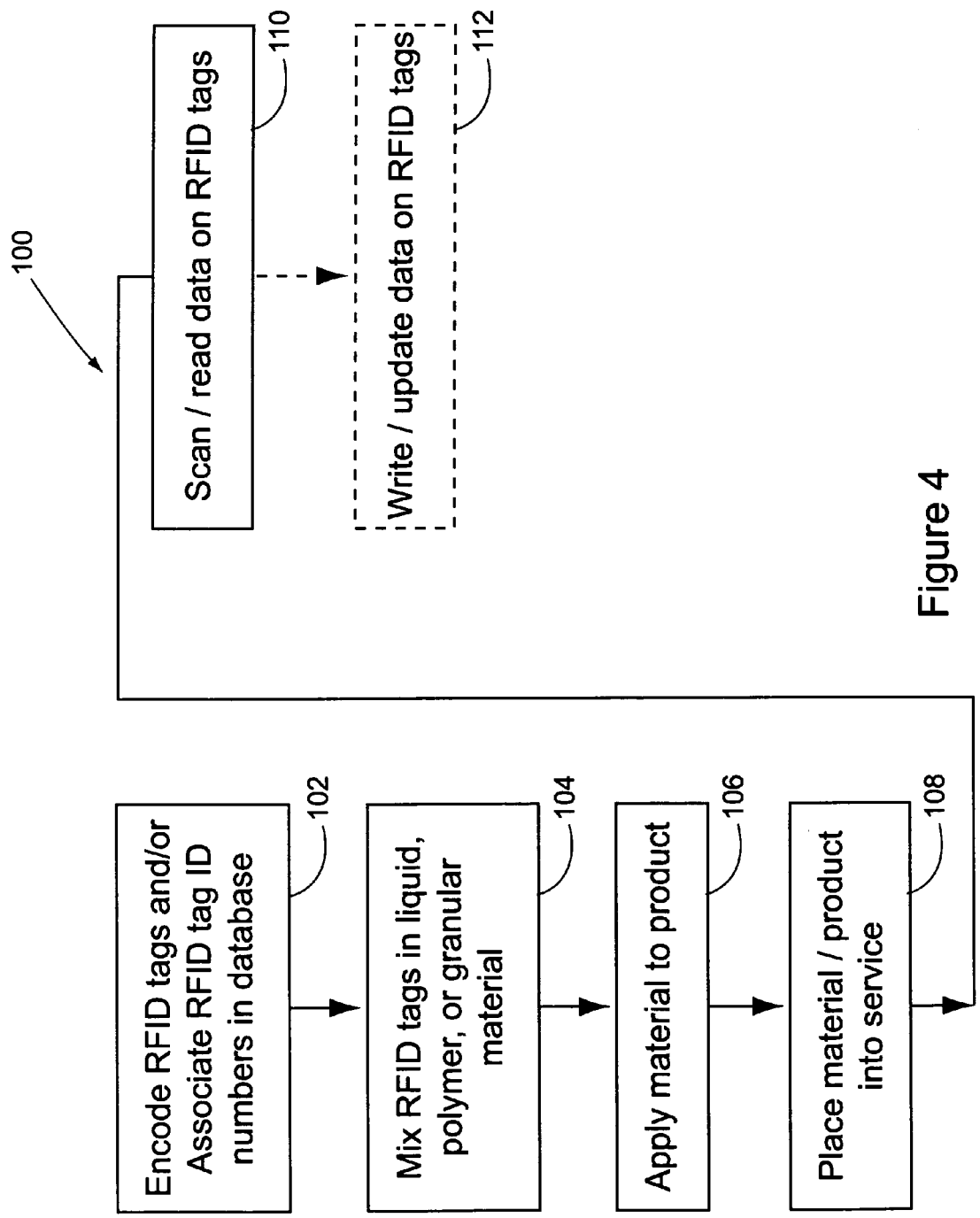
FIG. 4 illustrates a method in accordance with another preferred embodiment of the present method.

With reference now to FIG. 4, a method in accordance with a preferred embodiment of the present method is shown. The method 100 includes encoding the RFID tags with a number or code that identifies the RFID. The codes may also be entered into a database for subsequent record keeping as in operation 102. The encoded tags are mixed into the liquid as shown by step 104. As indicated by operation 106, the mixture of the material and the tag(s) is applied to the product, be it in the form of a coating or as the mold material. See operation 108. In an alternative embodiment the tags may be applied to the liquid after the liquid is applied to the product, or used to form the product. For example, after the product is coated with the liquid, the tags are dropped, sprinkled, or otherwise applied to the liquid. Thereafter, the properties of the tag and liquid then cause the tag to become embedded in the liquid. For instance, if the tag is denser than the liquid, the tag will sink into the liquid. If, for another example, the tag wets easily with the liquid or the liquid's surface tension is appropriate, the liquid may draw the tag into itself. Operation 110 shows the tags being read whereby the codes and data stored on the tags are gathered for subsequent use. In particular the codes are associated with the product and identify it accordingly.

In preferred embodiments where the reader is connected to a computer, the computer may update the database (of operation 102) with information associating the product to the RFID tag codes (e.g. the location of the reader or a batch number). In the alternative, data may be written to the tags such as, for example, maintenance or servicing data regarding the product, the date, time, and location when the tag was read along with the employee number of the employee who scanned the tag. Thus, the records regarding the product may be kept in the database or on the tags in the product. See operation 112.

In view of the foregoing, it will be seen that the several advantages of the invention are achieved and attained. In particular, the present invention provides methods and apparatus for improved radio frequency identification of products and other assets. In accordance with the principles of the present invention, the RFID tags embedded in the coatings and materials cannot be separated from the items they identify. Furthermore, because the tags may be embedded in a product, or in a coating on the product, the tag may be placed anywhere on, or in, the product. Whereas, with previous systems the identifying indicia had to be located on the surface and in locations not subject to mechanical abrasion, impact, shearing, or other abuse that might destroy or remove the indicia.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the liquids containing RFID tags provided by the present invention may be process fluids (e.g. crude oil being transported in a pipeline) whereby interrogation of the tags distinguishes the bulk material, by source and type, from other products in the transport system. Thus, the breadth and scope of the present invention should not be limited by any of the above-described exemplary embodiments, but should be defined only in accordance with the following claims appended hereto and their equivalents.

What is claimed is:

1. A method of identifying a product, comprising:
   introducing at least one radio frequency identification tag into a liquid being able to retain the tag when the liquid is applied to a surface;
   further comprising applying the liquid to coat the surface.

2. The method according to claim 1, further comprising energizing the tag.

3. The method according to claim 2, further comprising reading the tag to identify the product.

4. The method according to claim 3, further comprising introducing at least one MEMS sensor into the liquid.

5. The method according to claim 4, further comprising reading the MEMS sensor.

6. The method according to claim 3, wherein the identifying the product identifies the liquid, whereby the liquid is the product for which identification is occurring.

7. The method according to claim 1, further comprising, interrogating the tag to determine the information that an adjacent tag has communicated to the tag.

8. The method according to claim 1, further comprising selecting the liquid based on an electromagnetic property of the liquid and based on a frequency at which the tag operates.

9. The method according to claim 1, further comprising selecting a tag operating at a frequency based on an electromagnetic property of the liquid.

10. The method according to claim 1, further comprising using the liquid with the tag in it in a liquid process.

11. A mixture, comprising:
    a liquid; and
    a plurality of radio frequency identification tags in the liquid wherein the liquid being able to retain the tags when the liquid is applied to a surface.

12. The mixture according to claim 11, wherein the size of the tags is less than about 4 square millimeters.

13. The mixture according to claim 12, wherein the size of the tags is less than about 0.25 square millimeters.

14. The mixture according to claim 11, wherein the liquid is at least one of a coating, a paint, a varnish, a corrosion inhibitor, a sealant, an adhesive, a lubricant, a fuel, a lubricant, a hydraulic fluid, a putty, a caulk, and a solvent.

15. The mixture according to claim 11, wherein the tags are neutrally buoyant in the liquid.

16. The mixture according to claim 11, further comprising the liquid being a two-part mixture.

17. The mixture according to claim 11, further comprising a plurality of MEMS sensors in the liquid.

18. The mixture according to claim 11, wherein the tags communicate with one another.

19. The mixture according to claim 11, wherein the liquid includes an electromagnetic property that allows electromagnetic energy at the frequency at which at least one of the tags operates to pass through the liquid.

20. The mixture according to claim 11, wherein the liquid has a viscosity of about 100,000,000 centipoise or less.

21. An article of manufacture, comprising:
    a surface;
    a coating on the surface; and
    at least one radio frequency identification tag in the coating, the coating being able to retain the tag when the coating is a liquid and when the liquid is applied to the surface.

* * * * *